(12) United States Patent
Chen

(10) Patent No.: US 10,587,747 B2
(45) Date of Patent: Mar. 10, 2020

(54) METHOD, APPARATUS, TERMINAL, AND STORAGE MEDIUM FOR ENTERING NUMERIC SYMBOLS USING TOUCH SCREEN FRAME

(71) Applicant: NUBIA TECHNOLOGY CO., LTD, Shenzhen (CN)

(72) Inventor: Wenzhi Chen, Shenzhen (CN)

(73) Assignee: NUBIA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/569,955

(22) PCT Filed: Apr. 27, 2016

(86) PCT No.: PCT/CN2016/080409
§ 371 (c)(1),
(2) Date: Oct. 27, 2017

(87) PCT Pub. No.: WO2016/173498
PCT Pub. Date: Nov. 3, 2016

(65) Prior Publication Data
US 2018/0159973 A1     Jun. 7, 2018

(30) Foreign Application Priority Data
Apr. 27, 2015   (CN) .......................... 2015 1 0204712

(51) Int. Cl.
*H04M 1/725*      (2006.01)
*G06F 3/0488*     (2013.01)
(Continued)

(52) U.S. Cl.
CPC ...... *H04M 1/72583* (2013.01); *G06F 3/0233* (2013.01); *G06F 3/0488* (2013.01);
(Continued)

(58) Field of Classification Search
None
See application file for complete search history.

(56) References Cited

U.S. PATENT DOCUMENTS

2011/0157046 A1*  6/2011  Lee .................... G04G 21/08
                                                345/173
2015/0293592 A1* 10/2015  Cheong ................ G06F 3/016
                                                345/173

FOREIGN PATENT DOCUMENTS

CN       101482791 A     7/2009
CN       102103460 A     6/2011
(Continued)

OTHER PUBLICATIONS

The World Intellectual Property Organization (WIPO) International Search Report for PCT/CN2016/080409 Jul. 26, 2016 4 Pages (including translation).

*Primary Examiner* — Brian M Butcher
(74) *Attorney, Agent, or Firm* — Anova Law Group, PLLC

(57) ABSTRACT

A method, apparatus, computer storage medium, and terminal for entering numeric symbols using a touch screen frame related to the field of communication technology. The method includes: receiving an instruction to start a numeric keypad, opening the numeric keypad in a special region on edge of a touch screen, receiving a touch operation input by the user on the numeric keypad, and determining a number or a symbol corresponding to the touch operation based on the operation region of the touch operation and the number of the click operation included in the touch operation. Thus, users can make a phone call with one hand or can enter the corresponding number or symbol keys in the answer to the phone while listening to the information. It is easy to operate and can improve the user experience.

18 Claims, 6 Drawing Sheets

(51) Int. Cl.
*H04M 1/23* (2006.01)
*G06F 3/023* (2006.01)
(52) U.S. Cl.
CPC ........ *G06F 3/04886* (2013.01); *H04M 1/236* (2013.01); *H04M 1/72519* (2013.01); *H04M 2201/42* (2013.01); *H04M 2250/22* (2013.01)

(56) References Cited

FOREIGN PATENT DOCUMENTS

| | | | |
|---|---|---|---|
| CN | 102404453 | A | 4/2012 |
| CN | 102486681 | A | 6/2012 |
| CN | 103179243 | A | 6/2013 |
| CN | 104866135 | A | 8/2015 |
| JP | 1153116 | A | 2/1999 |

\* cited by examiner

METHOD, APPARATUS, TERMINAL, AND STORAGE MEDIUM FOR ENTERING NUMERIC SYMBOLS USING TOUCH SCREEN FRAME

CROSS-REFERENCE TO RELATED APPLICATIONS

This application is a national phase entry under 35 U.S.C. § 371 of International Application No. PCT/CN2016/080409, filed on Apr. 27, 2016, which claims priority to and benefits of Chinese Patent Application Serial No. 201510204712.X, filed with the State Intellectual Property Office of P. R. China on Apr. 27, 2015, the entire content of all of which is incorporated herein by reference.

FIELD OF THE DISCLOSURE

The present disclosure generally relates to the field of communication technology and, more particularly, relates to a method and apparatus, a terminal, and a storage medium for entering numeric symbols using a touch screen frame.

BACKGROUND

With the rapid development of communication technology, most mobile terminals such as mobile phones have adopted touch screen techniques. Mobile terminals using touch screen techniques usually display the numeric keypad in the middle of the screen with a number or a symbol corresponding to a button. When a number needs to be entered, a user often looks at the screen to operate with both hands or, otherwise, it is very easy to enter a wrong number. Such operation is very inconvenient. The inconvenience is more prominent when, particularly, the user needs to enter numbers or symbols in the course of making a call. Taking the service calls as an example, the user often needs to enter numbers according to instructions on the selection of appropriate services. The user needs to first listen to the instruction, and then look at the input keypad to enter the number, causing very inconvenient operations. The user may use hands-free calling, but it not only involves the user's privacy but also affects other persons, lowering the user experience.

Therefore, it is necessary to provide a method and apparatus for entering numeric symbols using the touch screen frame to facilitate the operation of the user and to improve the user experience.

BRIEF SUMMARY OF THE DISCLOSURE

The main objective of embodiments of the present disclosure is to provide a method and apparatus, a terminal, and a storage medium for entering numeric symbols using a touch screen frame. The disclosure is intended to solve the inconvenience of the conventional one-handed input methods and problems related to the need of the hands-free calling or listening first and then looking at the keypad to enter the number.

The technical solution according to embodiments of the present disclosure is as follows.

One aspect of the present disclosure provides a method for entering numeric symbols using a touch screen frame, the method comprising:
  receiving an instruction to start a numeric keypad;
  opening the numeric keypad in a specific region on edge of the touch screen;
  receiving a touch operation entered by a user on the numeric keypad;
  determining a number or a symbol corresponding to the touch operation according to an operation region of the touch operation and the number of clicks included in the touch operation.

According to one embodiment of the present disclosure, determining the number or symbol corresponding to the touch operation according to the operation region of the touch operation and the number of clicks included in the touch operation comprises:
  when the operation region is a numeric region, calculating the number of clicks included in the touch operation, and determining the number entered by the touch operation based on the number of clicks of the touch operation; and
  when the operation region is a symbol region, calculating the number of clicks included in the touch operation, and determining the symbol or number 0 entered by the touch operation based on the number of clicks and the pre-set corresponding relationship between the number of clicks and symbols.

According to one embodiment of the disclosure, calculating the number of clicks included in the touch operation comprises:
  A. when the touch operation input is started, determining the validity of a Pn click operation, and when the click operation is valid, incrementing a control counter by 1 and performing step B, where an initial value of the counter is 0; and
  B. if Pn and Pn+1 constitute a valid double-clicks operation, incrementing the control counter by 1, otherwise, recognizing a completion of the touch operation input, and setting the number of clicks included in the touch operation as a value of the counter.

According to one embodiment of the present disclosure, opening the numeric keypad in a specific region on edge of the touch screen, comprises:
  identifying a left hand or a right hand by which the current user holds the mobile terminal;
  opening the numeric keypad that is suitable for the left hand when the current user holds the mobile terminal by the left hand; and
  opening the numeric keypad that is suitable for the right hand when the current user holds the mobile terminal by the right hand.

According to one embodiment of the present disclosure, the method further comprises:
  receiving a numeric keypad close instruction;
  closing the numeric keypad of the designated region.

The second aspect of the present disclosure provides an apparatus for entering numeric symbols using a touch screen frame, the apparatus comprising:
  a first receiving unit, configured to receive an instruction to start a numeric keypad;
  a numeric keypad control unit, configured to open the numeric keypad in a designated region on edge of the touch screen;
  a second receiving unit, configured to receive a touch operation inputted by the user on the numeric keypad; and
  an input content determination unit, configured to determine a number or a symbol corresponding to the touch operation based on an operation region of the touch operation and a number of clicks included in the touch operation.

According to one embodiment of the present disclosure, the input content determination unit is further configured to calculate the number of clicks included in the touch operation when the operation region is the numeric region, and to determine the input number of the touch operation based on the number of clicks, or to calculate the number of clicks included in the touch operation when the operation region is the symbol region, and to determine the symbol or number 0 entered by the touch operation based on the number of clicks and the pre-set corresponding relationship between the number of clicks and symbols.

According to one embodiment of the present disclosure, the input content determination unit comprises:
  a click determination module, configured to determine the validity of a Pn click operation when the click operation is started, and to increment a control counter by 1 when the click operation is valid, where an initial value of the counter is 0; and
  a double-clicks determination module, configured to determine whether Pn and Pn+1 constitute a valid double-clicks operation when the Pn click operation is valid. If the valid double-clicks operation is constituted, the control counter is incremented by 1, otherwise, a completion of the touch operation input is determined, and the value of the counter is the number of clicks included in the touch operation.

According to one embodiment of the present disclosure, the numeric keypad opening unit comprises:
  a determining module, configured to identify the left or right hand by which the current user holds the mobile terminal; and
  an opening module, configured to open the numeric keypad that is suitable for the left hand when the current user holds the mobile terminal by the left hand or to open the numeric keypad that is suitable for the right hand when the current user holds the mobile terminal by the right hand.

According to one embodiment of the present disclosure, the first receiving unit, further configured to receive a numeric keypad close instruction; and the numeric keypad control unit, further configured to close the numeric keypad in the designated region on edge of the touch screen.

The third aspect of the disclosure provides a computer storage medium, the computer storage medium storing computer-executable instructions, and the computer-executable instructions comprise:
  receiving an instruction to start a numeric keypad;
  opening the numeric keypad in a specific region on edge of the touch screen;
  receiving a touch operation entered by a user on the numeric keypad;
  determining a number or a symbol corresponding to the touch operation according to an operation region of the touch operation and the number of clicks included in the touch operation.

The fourth aspect of the disclosure provides a mobile terminal comprising a touch screen and a processor, wherein the processor is configured to execute the following steps: receiving an instruction to open a numeric keypad; opening the numeric keypad in a designated region on edge of the touch screen; receiving a touch operation input by a user on the numeric keypad; determining a number or symbol corresponding to the touch operation based on the operation region of the touch operation and the number of clicks included in the touch operation.

The fifth aspect of the disclosure provides a mobile terminal, comprising:
  a storage medium, configured to store computer-executable instructions; and
  a processor, configured to execute the computer-executable instructions stored on the storage medium, the computer-executable instructions comprising: receiving instructions to open a numeric keypad; opening the numeric keypad in a designated region on edge of the touch screen; receiving a touch operation input by a user on the numeric keypad; determining a number or symbol corresponding to the touch operation based on the operation region of the touch operation and the number of clicks included in the touch operation.

The embodiments of the present disclosure include a method, apparatus, computer storage medium, and terminal for entering numeric symbols using a touch screen frame related to the field of communication technology. When the frame touch function is enabled by the mobile terminal and the instruction to start the numeric keypad is received, the numeric keypad is opened in the designated region on the edge of the touch screen, and the touch operation entered by the user on the numeric keypad is received. The number or symbol corresponding to the touch operation is determined based on the operation region of the touch operation and the number of clicks included in the touch operation. Therefore, the user can make a call with the one-hand operation or enter the relative numbers or symbol keys while listening to the information in the answer to the phone. It is easy to operate and can improve the user's experience.

Reference will now be made in detail to exemplary embodiments of the disclosure, which are illustrated in the accompanying drawings.

DETAILED DESCRIPTION

It should be noted that the embodiments disclosed herein are exemplary only and are not intended to limit the scope of the present disclosure.

The various embodiments of a mobile terminal in the present disclosure are described with reference to the accompanying drawings. In the subsequent description, suffixes such as "module", "part", or "unit" used for referring to elements is given merely to facilitate explanation of the present disclosure, without having any significant meaning by itself. Accordingly, the "module" and "part" may be mixedly used.

Mobile terminals may be implemented in various forms. For example, the terminal described in the present disclosure may include mobile terminals, such as mobile phones, smartphones, notebook computers, digital broadcast receivers, PDAs (Personal Digital Assistants), PADs (Tablet Computers), PMPs (Portable Multimedia Players), navigation devices, and the like, and fixed terminals such as digital TVs, desktop computers, and the like. Hereinafter, it is assumed that the terminal is a mobile terminal. However, it would be understood by a person in the art that the configuration according to the embodiments of the present disclosure can be also applicable to the fixed types of terminals, except for any elements especially configured for a mobile purpose.

Figure 1:
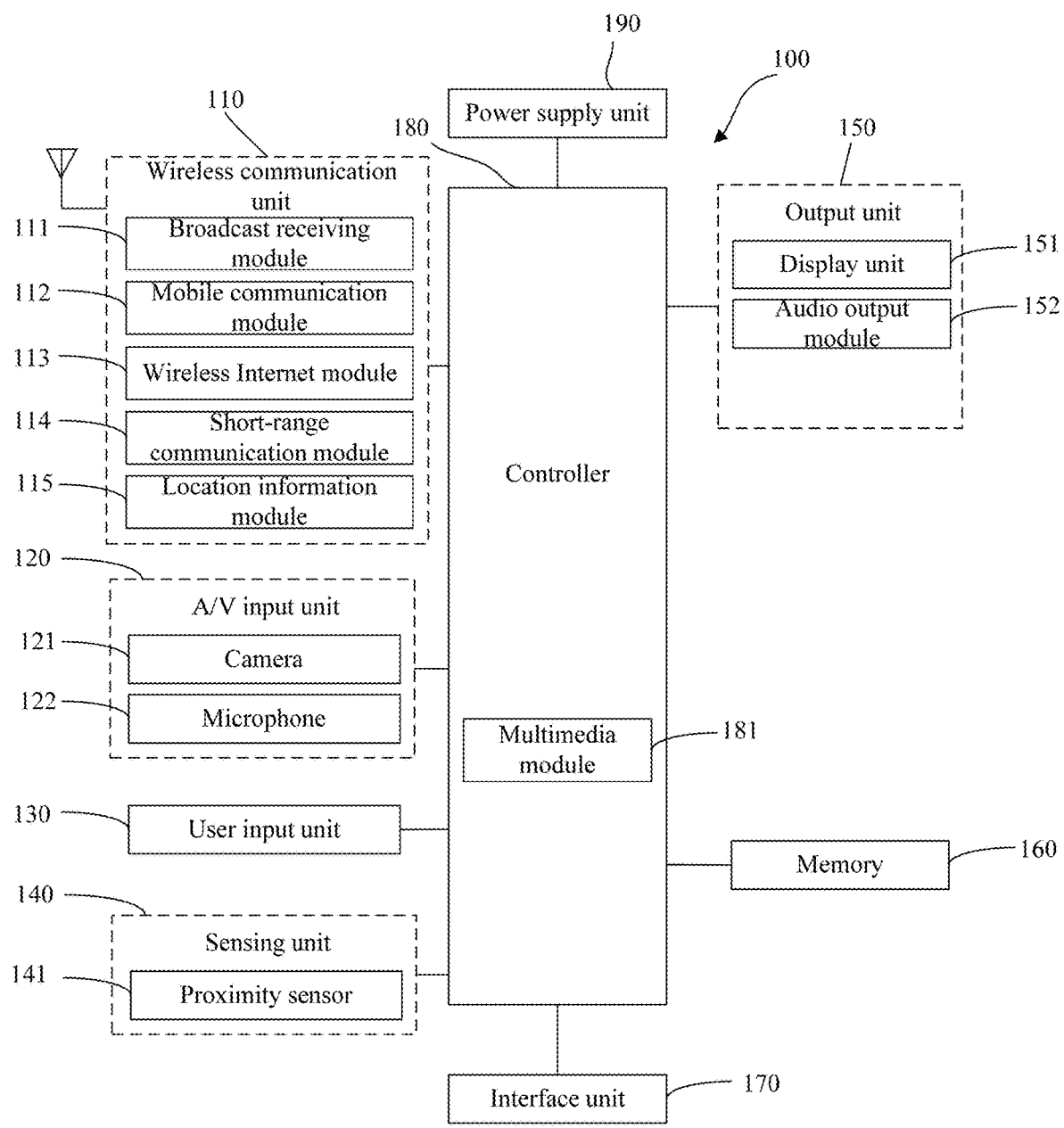
FIG. 1 is a schematic diagram of a hardware structure of a mobile terminal according to various disclosed embodiments of the present disclosure.

FIG. 1 is a schematic diagram of a hardware structure of a mobile terminal according to various disclosed embodiments of the present disclosure. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190, and the like. FIG. 1 shows the mobile terminal as having various components, but it should be understood that implementing all of the illustrated components is not a requirement. More or fewer components may optionally be implemented. The components of the mobile terminal will be described in detail below.

The wireless communication unit 110 typically includes one or more components allowing radio communication between the mobile terminal 100 and a wireless communication system or a network. For example, the wireless communication unit may include at least one of a broadcast receiving module 111, a mobile communication module 112, a wireless internet module 113, a short-range communication module 114, and a location information module 115.

The broadcast receiving module 111 receives broadcast signals and/or broadcast-associated information from an external broadcast management server via a broadcast channel. The broadcast channel may include a satellite channel and/or a terrestrial channel. The broadcast management server may be a server that generates and transmits a broadcast signal and/or broadcast-associated information or a server that receives a previously generated broadcast signal and/or broadcast-associated information and transmits the same to the terminal. The broadcast signal may include a TV broadcast signal, a radio broadcast signal, a data broadcast signal, and the like. Also, the broadcast signal may further include a broadcast signal combined with a TV or radio broadcast signal. The broadcast-associated information may also be provided via a mobile communication network and, in this instance, the broadcast-associated information may be received by the mobile communication module 112. The broadcast signal may exist in various forms. For example, it may exist in the form of an electronic program guide (EPG) of digital multimedia broadcasting (DMB), an electronic service guide (ESG) of digital video broadcast-handheld (DVB-H), and the like. The broadcast receiving module 111 may be configured to receive broadcast signals by using various types of broadcast systems. In particular, the broadcast receiving module 111 may be configured to receive a digital broadcast signal by using a digital broadcasting system such as digital multimedia broadcast-terrestrial (DMB-T), digital multimedia broadcasting-satellite (DMB-S), digital video broadcast-handheld (DVB-H), the data broadcasting system known as media forward link only (MediaFLO@), integrated services digital broadcast-terrestrial (ISDB-T), and the like. The broadcast receiving module 111 may be configured to be suitable for every broadcast system that provides a broadcast signal as well as the above-mentioned digital broadcast system. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal, and a server. Such radio signals may include a voice call signal, a video call signal, or various types of data according to text and/or multimedia message transmission and/or reception.

The wireless internet module 113 supports wireless Internet access of the mobile terminal. The module may be internally or externally coupled to the terminal. The wireless Internet access technique to which the module relates may include a WLAN (Wireless LAN) (Wi-Fi), Wibro (wireless broadband), Wimax (Worldwide Interoperability for Microwave Access), HSDPA (High-Speed Downlink Packet Access), and the like.

The short-range communication module 114 is a module for supporting short-range communications. Some examples of short-range communication technology include Bluetooth™, Radio Frequency Identification (RFID), Infrared Data Association (IrDA), Ultra-Wideband (UWB), Purple Bee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate the three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location information in real time.

The A/V input unit 120 is configured to receive an audio or video signal. The A/V input unit 120 may include a camera 121 and a microphone 1220. The camera 121 processes image data of still pictures or video obtained by the image capturing device in an image capturing mode or a video capturing mode. The processed image frame may be displayed on a display unit 151. The image frame processed by the camera 121 may be stored in a memory 160 (or other storage medium) or transmitted via the wireless communication unit 110. Two or more cameras 1210 may be provided according to the configuration of the mobile terminal. The microphone 122 may receive sounds (audible data) via a microphone in a phone call mode, a recording mode, a voice recognition mode, and the like, and can process such a sound into audio data. The processed audio (voice) data may be converted for output into a format transmittable to a mobile communication base station via the mobile communication module 112 during the phone call mode. The microphone 122 may implement various types of noise cancellation (or suppression) algorithms to eliminate (or suppress) noise or interference generated in the course of receiving and transmitting audio signals.

The user input unit 130 may generate key input data from commands entered by a user to control various operations of the mobile terminal. The user input unit 130 allows the user to input various types of information, and may include a keyboard, a dome switch, a touch pad (e.g., a touch sensitive assembly that detects changes in resistance, pressure, capacitance, etc. due to being contacted), a jog wheel, a jog switch, and the like. In particular, when the touch pad is overlaid on the display unit 151 in a layered manner, it may form a touch screen.

The sensing unit 140 detects a current status of the mobile terminal 100 (such as an opened or closed state of the mobile terminal 100), a location of the mobile terminal 100, the presence or absence of the user's contact with the mobile terminal 100 (i.e., the touch input), the orientation of the mobile terminal 100, an acceleration or deceleration movement and direction of the mobile terminal 100, and the like, and generates a command or signal for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled to the external device. The sensing unit 140 may include a proximity sensor 1410. This will be described in relation to a touch screen later.

The interface unit 170 serves as an interface by which at least one external device may be connected to the mobile terminal 100. For example, the external devices may include wired or wireless headset ports, external power supply (or a battery charger) ports, wired or wireless data ports, memory card ports, ports for connecting a device having an identification module, audio input/output (I/O) ports, video I/O ports, earphone ports, or the like. The identification module may be a memory chip that stores various information for authenticating a user's authority for using the mobile terminal 100 and may include a user identity module (UIM), a subscriber identity module (SIM), a universal subscriber identity module (USIM), and the like. In addition, a device having an identification module (referred to as the "identifying device", hereinafter) may take the form of a smart card. Accordingly, the identifying device may be connected with the mobile terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with the external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may be operated as a signal for recognizing that the mobile terminal is accurately mounted on the cradle. The output unit 150 is configured to provide outputs in a visual, audible, and/or tactile manner (e.g., audio signal, video signal, alarm signal, vibration signal, etc.). The output unit 150 may include a display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphical User Interface (GUI) associated with a call or other communication (such as text messaging, multimedia file download, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin-Film Transistor LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particularly desired embodiment. For example, the mobile terminal may include both an external display unit (not shown) and an internal display unit (not shown). The touch screen can be configured to detect even a touch input pressure as well as a touch input position and a touch input region.

The audio output module 152 may convert, and output as sound, audio data received by the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal receiving sound, a message receiving sound, etc.). The audio output module 152 may include a speaker, a buzzer, or the like.

The alarm unit 153 may provide outputs to inform about the occurrence of an event of the mobile terminal 100. Typical events may include call reception, message reception, key signal input, touch input, and the like. In addition to audio or video outputs, the alarm unit 153 may provide outputs in a different manner to inform about the occurrence of an event. For example, the alarm unit 153 may provide an output in the form of vibrations. When a call, a message, or some other incoming communication (incomingcommunication) is received, the alarm unit 153 may provide tactile outputs (i.e., vibrations) to notify the user thereof. By providing such tactile outputs, the user can recognize the occurrence of various events even if the user's mobile phone is in the user's pocket. Outputs informing about the occurrence of an event may be also provided via the display unit 151 or the audio output module 152 by the alarm unit 153.

The memory 160 may store software programs or the like used for the processing and controlling operations performed by the controller 180, or may temporarily store data (e.g., phone books, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs a storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 1810 for reproducing (or playing back) the multimedia data. The multimedia module 1810 may be configured within the controller 180 or may be configured to be separated from the controller 180. The controller 180 may perform a pattern recognition processing to recognize a handwriting input or a picture drawing input performed on a touchscreen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing at least one function or operation. Software codes can be implemented by a software application (or program) written in any suitable programming language, which may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present disclosure can be applicable to any type of mobile terminal, without being limited to a slide-type mobile terminal.

The mobile terminal 100 as shown in FIG. 1 may be configured to operate with a communication system, which transmits data via frames or packets, such as wired and wireless communication systems, as well as satellite-based communication systems.

The communication systems in which the mobile terminal according to an embodiment of the present disclosure can operate will now be described with reference to FIG. 2.

Such communication systems may use different air interfaces and/or physical layers. For example, air interfaces utilized by the communication systems include, for example, Frequency Dividing Multiple Access (FDMA), Time Dividing Multiple Access (TDMA), Code Dividing Multiple Access (CDMA), and Universal Mobile Telecommunication Systems (UMTS) [in particular, Long-Term Evolution (LTE)], Global System for Mobile Communications (GSM), and the like. As a non-limiting example, the description hereafter relates to a CDMA communication system, but such teachings apply equally to other types of systems.

Figure 2:
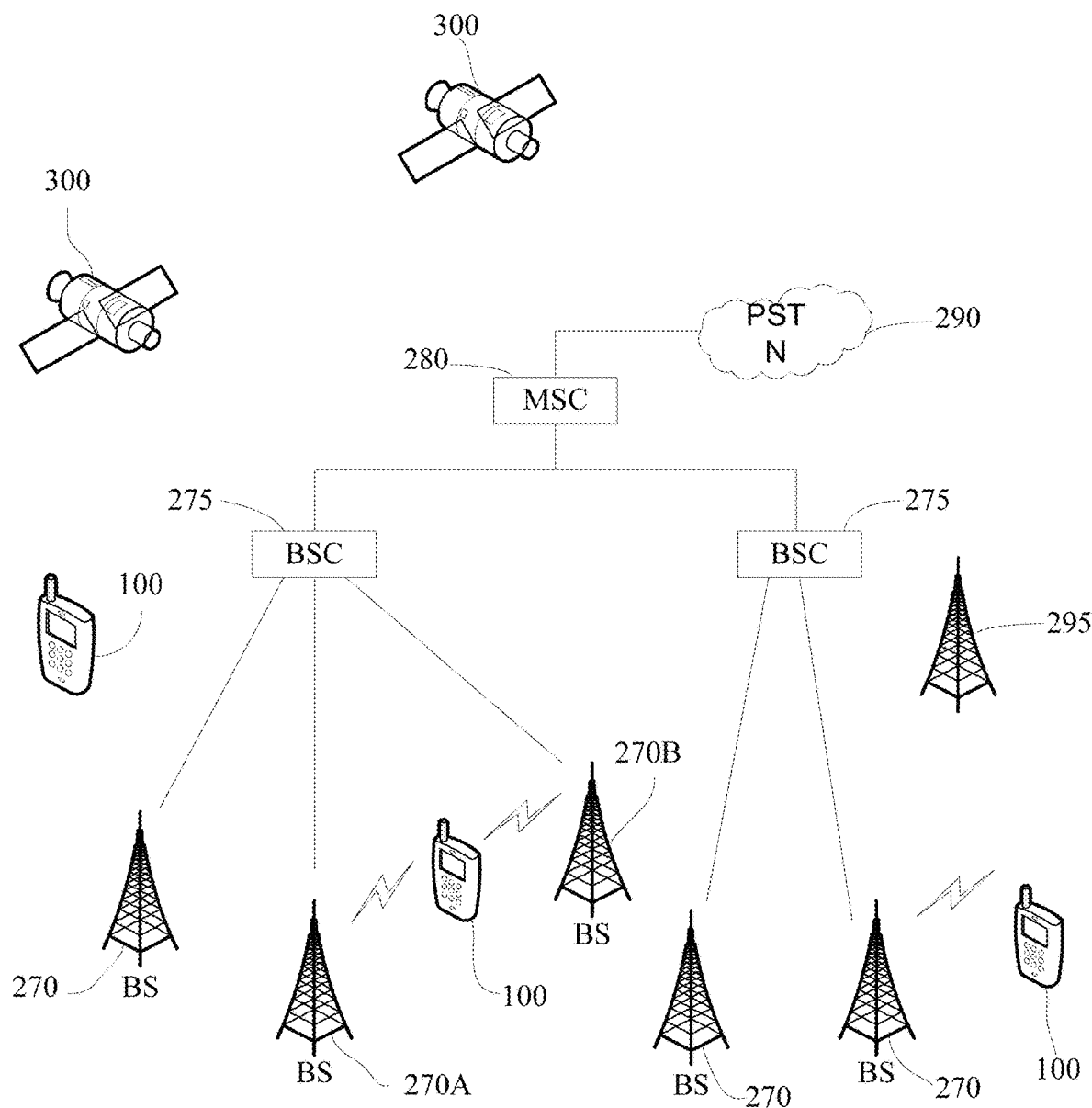
FIG. 2 is a schematic diagram of a wireless communication system of a mobile terminal in the embodiment of FIG. 1.

Referring to FIG. 2, a CDMA wireless communication system may include a plurality of mobile terminals 100, a plurality of base stations (BSs) 270, base station controllers (BSCs) 275, and mobile switching centers (MSCs) 280. The MSC 280 is configured to interface with a Public Switched Telephone Network (PSTN). The MSC 280 is also configured to interface with the BSCs 275, which may be coupled to the base station 270 via backhaul lines. The backhaul lines may be configured in accordance with any of several known interfaces including, for example, E1/T1, ATM, IP, PPP, Frame Relay, HDSL, ADSL or xDSL. It is to be understood that the system as shown in FIG. 2 may include a plurality of BSCs 2750.

Each BS 270 may serve one or more sectors (or regions), each sectors covered by an omni-directional antenna or an antenna pointed in a particular direction radially away from the BS 270. Optionally, each sector may be covered by two or more antennas for diversity reception. Each BS 270 may be configured to support a plurality of frequency assignments, and each frequency assignment has a particular spectrum (e.g., 1.25 MHz, 5 MHz, etc.).

The intersection of a sector and frequency assignment may be referred to as a CDMA channel. The BS 270 may also be referred to as base station transceiver subsystems (BTSs) or other equivalent terms. In this situation, the term "base station" may be used to collectively refer to a single BSC 275 and at least one BS 270. The base station may also be referred to as a "cell site". Optionally, individual sectors of a particular BS 270 may be referred to as a plurality of cell sites.

As shown in FIG. 2, a broadcasting transmitter (BT) 295 transmits a broadcast signal to the mobile terminal 100 operating within the system. The broadcast receiving module 111 shown in FIG. 1 is provided at the mobile terminal 100 to receive the broadcast signals transmitted by the BT 295. Several Global Positioning System (GPS) satellites 300 are shown in FIG. 2. The satellites 300 help locate on least one of the plurality of mobile terminals 100.

A plurality of satellites 300 is depicted in FIG. 2, but it is understood that useful positioning information may be obtained using any number of satellites. The GPS module 115 as shown in FIG. 1 is typically configured to cooperate with the satellite 300 to obtain the desired positioning information. Instead of or in addition to GPS tracking techniques, other technologies that may track the location of the mobile terminals may be used. In addition, at least one of the GPS satellite 300 may selectively or additionally handle satellite DMB transmissions.

As one typical operation of the wireless communication system, the BSs 270 receive reverse-link signals from various mobile terminals 100. The mobile terminals 100 typically engage in calls, messaging, and other types of communications. Each reverse-link signal received by a particular base station 270 is processed within a particular BS 270. The resulting data is forwarded to an associated BSC 275. The BSC provides call resource allocation and mobility management functionality including the coordination of soft handoff procedures between BSs 270. The BSCs 275 also routes the received data to the MSC 280, which provides additional routing services for interfacing with the PSTN 290. Similarly, the PSTN 290 interfaced with the MSC 280, the MSC interfaces with the BSCs 27s, and the BSC 275s in turn control the BSs 270 to transmit forward-link signals to the mobile terminal 100.

Based on the above-mentioned hardware structure of the mobile terminal and communication system, various embodiments of the present disclosure are described below.

Figure 3:
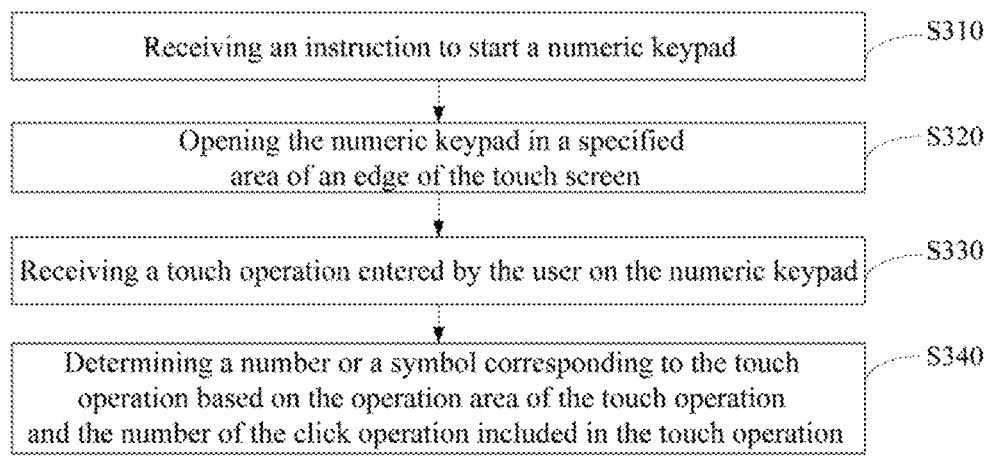
FIG. 3 is a flow chart of a method for entering numeric symbols using a touch screen frame according to embodiments of the present disclosure.

As shown in FIG. 3, the first embodiment of the present disclosure provides a method for entering numeric symbols using a touch screen frame, comprising the following steps.

S310, receiving an instruction to start a numeric keypad;

S320, opening the numeric keypad in a specific region on the edge of the touch screen;

S330, receiving a touch operation entered by a user on the numeric keypad;

S340 determining a number or a symbol corresponding to the touch operation according to an operation region of the touch operation and the number of clicks included in the touch operation.

Specifically, when the system starts the numeric keypad or receives the relevant instruction, it is considered that the instruction to start the numeric keypad has been received. The system starts the numeric keypad, which means that the system displays the numeric keypad according to the received instruction for the user to perform numeric operations. The numeric keypad is usually displayed in the middle of the screen.

Specifically, opening a frame touch function by the mobile terminal is as follows:
  dividing a touch region into two sub-regions, and assigning an input device to each sub-region, where one of the two sub-regions is a specific sub-region (i.e., a designated region), which may be referred to as C-zone, and another sub-region may be referred to as A-zone;
  when the touch operation occurs in the specific sub-region, receiving the touch operation, and reporting the touch operation via the input device corresponding to the specific sub-region; and
  processing the touch operation in a special manner.

In practical applications, it is also possible to set and modify an interface of the specific sub-region in a driver layer, as well as to modify the specific sub-region via the interface in an upper layer.

It should be noted that the upper layer described in the present disclosure generally refers to a framework layer, an application layer, and the like. In a mobile terminal system, a custom system such as an Android, an IOS, or the like, typically includes a bottom layer (e.g., physical layer, driver layer) and an upper layer (e.g., frame layer, application layer). The direction of the signal flow is as follow: the physical layer (touch pad) receiving a user's touch operation; converting a physical pressure into an electrical signal TP; transmitting the TP to the drive layer; analyzing the location of a press by the drive layer; obtaining the specific coordinates of the location, as well as the duration, pressure, and other parameters; uploading the parameters to the framework layer, where the communication between the framework layer and the driver layer can be achieved through the corresponding interface; the framework layer receiving an input device (input) of the driver layer; analyzing the input device; thereby choosing to respond or not respond to the input device; and passing the valid input up to the specific application so as to achieve performing different application operations according different events in the application layer.

Figure 4:
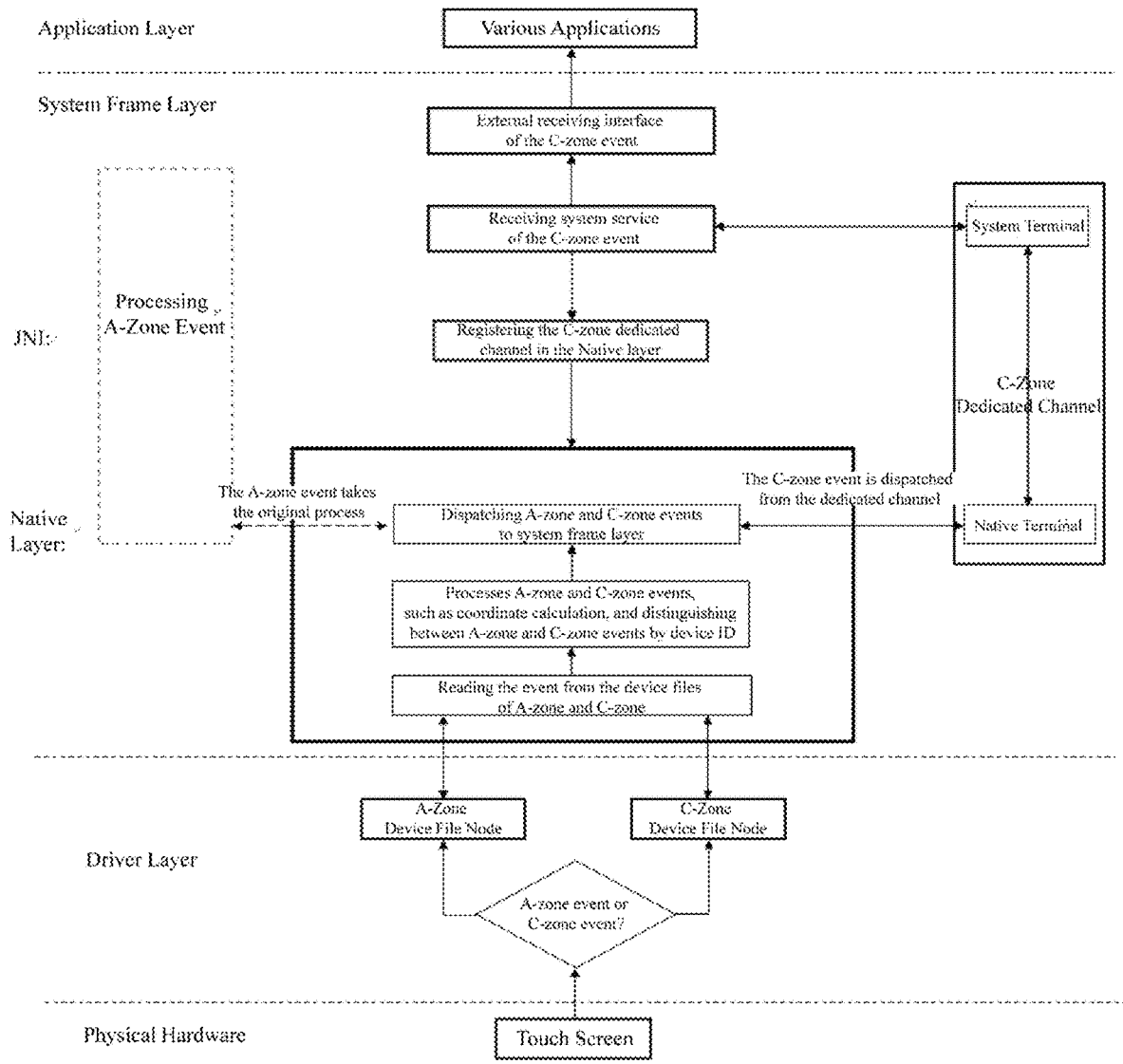
FIG. 4 is a flow chart of reporting the touch event in the embodiment of FIG. 3.

Refer to FIG. 4 for a reporting process of a specific touch event.

The driver layer receives the touch event through a physical hardware such as the touch screen, and determines that the touch operation occurred in the A-zone or C-zone, accordingly, reports the event through the A-zone file node or the C-zone device file node. A Native layer reads events from device files of the A-zone and C-zone, and processes the A-zone and C-zone events, such as coordinate calculation, then identifies the A-zone and C-zone events by device IDs, and finally dispatches the A-zone and C-zone events. The A-zone event is dispatched from a normal channel. That is, the A-zone event is processed in a normal manner. The C-zone event is dispatched from a C-zone dedicated channel which is pre-registered in the Native layer. The C-zone event is inputted from a Native terminal and is outputted to a system terminal until the end of system service of the C-zone event, and is listened by the listener, then is reported to various applications via an external interface of the C-zone event. In the present disclosure, an accidental-touch-prevention-region is implemented by using the software code in the driver layer, that is, a user-defined specific sub-region. The implementation of the present disclosure is in the driver layer rather than firmware, which makes it easy for the software design of the mobile terminal to break through the restriction of the touch screen IC suppliers, improving the design flexibility and decreasing the cost.

In practical applications, it can also free customize and adjust the number, location, size and other parameters of specific sub-regions based on the needs of the upper layer. That is, specific sub-regions of the present disclosure are not fixed but can be changed as the display interface or application is switched, including changes in number, position, and size.

Figure 6:
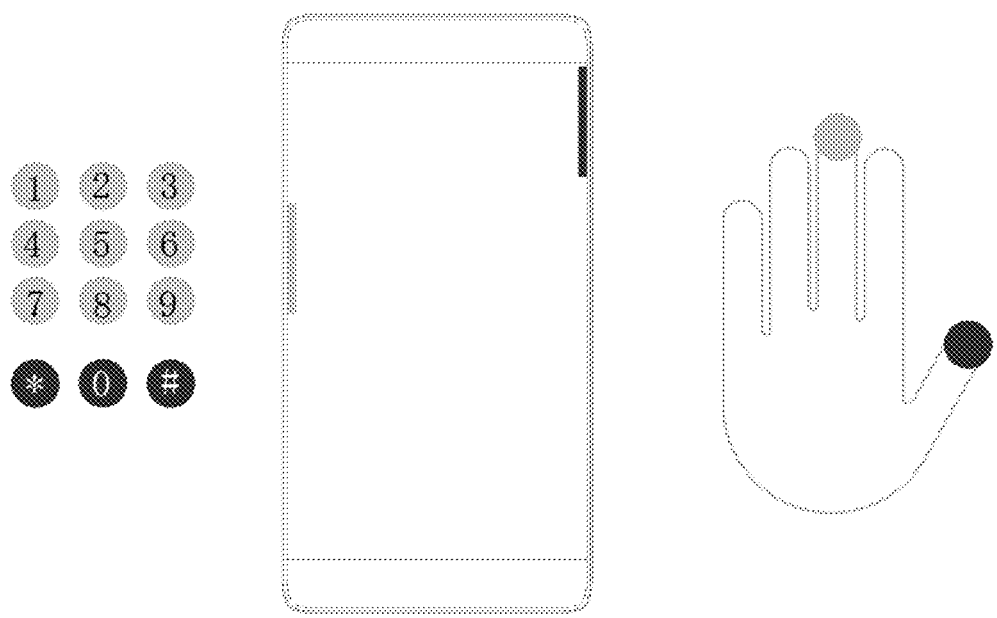
FIG. 6 is a schematic representation of a dividing of numeric keypad region in the embodiment of FIG. 3.

In the present embodiment, specific sub-regions may be provided on edge of the left and right sides of the mobile terminal, such as the black region and the gray region of the mobile terminal shown in FIG. 6.

Figure 5:
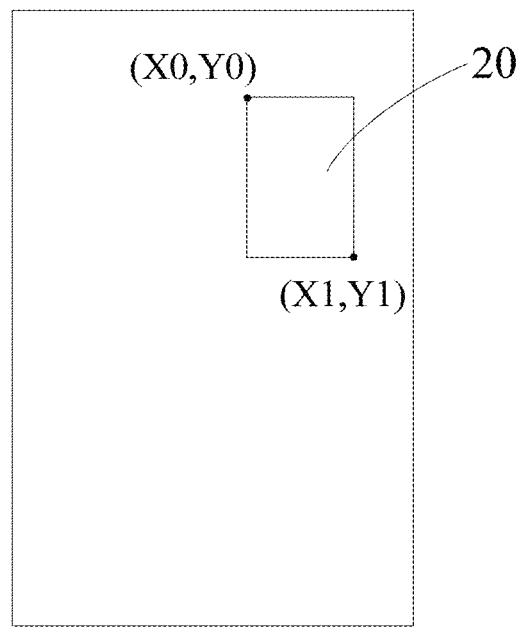
FIG. 5 a schematic representation of a specific sub-region in the disclosed embodiment of FIG. 3.

The specific sub-region may preferably be a rectangle, and may, of course, be provided as other shapes as needed, such as a half oval, and the like. When the specific sub-region is rectangle, the interface can be set in the drive layer as Set_zone (id, X0, Y0, X1, Y1). As shown in FIG. 5, (X0, Y0) and (X1, Y1) are the coordinates of two diagonal vertices of the specific sub-region 20, respectively. The coordinates of the two diagonal vertices determine the position and size of the rectangle. The location and size of the specific sub-region 20 can be modified in the driver layer or the upper layer. The id is the sequential number of the specific sub-region, and the number of specific sub-regions can be adjusted by the sequential number.

In practical applications, when the numeric keypad is not turned on in the specific sub-region, the special processing of the touch operation comprises: ignoring the touch operation or generating effects according to the touch operation.

In practical applications, the location and size of the specific sub-region may also be modified by entering the coordinates of the two diagonal vertices of the specific sub-region through the interface in the upper layer.

Further, in a preferred embodiment, step S340 includes:
  when the operation region is a numeric region, calculating the number of clicks included in the touch operation, and determining a number entered by the touch operation based on the number of clicks of the touch operation; and
  when the operation region is a symbol region, calculating the number of clicks included in the touch operation, and determining a symbol or number 0 entered by the touch operation based on the number of clicks and the pre-set corresponding relationship between the number of clicks and symbols.

Specifically, the touch operation is usually an operation such as click, sliding, and the like, and each touch operation is composed of one or more touch points. Thus, the mobile terminal can determine whether the touch operation occurs in the normal sub-region or the specific sub-region, according to the region where the touch point of the touch operation falls into. Specifically, the driving layer of the mobile terminal acquires the coordinates of the touch point of the touch operation and determines into which sub-region the coordinates of the touch point fall. When the coordinates of the touch point fall into the specific sub-region, it is determined that the touch operation occurs in the specific region.

After receiving the report events (the report events including the input device and the touch point parameters, etc.) in the frame layer, firstly, the touch region corresponding to the reported event is recognized, according to an identification of the input device. When the driver layer (Kernel) recognizes the touch operation occurred in the specific sub-region, the input device through which the drive layer reports to the framework layer is the input device of the specific sub-region (for example, if the input device of the specific sub-region is input1, then the report input device is input1). That is, the framework layer does not need to determine in which sub-region the current contact occurred, and does not need to determine the size and location of the sub-region either. These determinations are performed in the driver layer. In addition, the driver layer reports not only the specific input device, but also the parameters of the touch point to the framework layer, such as the pressing time, location coordinates, pressure size, and the like.

Specifically, the operation region of the numeric keypad and numbers according to different touch operations can be pre-set.

Using FIG. 6 as an example, the gray region on the left side can be set as the numeric region, and the black region on the right side can be set as the symbol region, and vice versa.

Different touch operations in the numeric region may be corresponding to the input number 1-9, respectively, for example, one click in the numeric region corresponds to the input number 1, two clicks correspond to the input number 2, and so forth, nine clicks correspond to the input number 9.

Different touch operations in the symbol region are corresponding to the input number 0, the symbols * or #, and other commonly used symbols, respectively. For example, one click in the symbol region corresponds to the *, two clicks correspond to 0, three clicks correspond to the #.

It should be noted that the specific corresponding relation can be flexibly set in practical applications.

Further, in a preferred embodiment, calculating the number of clicks included in the touch operation comprises:

A. when the touch operation input is started, determining the validity of a $P_n$ click operation, and when the click operation is valid, incrementing a control counter by 1 and performing step B, where the initial value of the counter is 0; and B. if $P_n$ and $P_{n+1}$ constitute a valid double-clicks operation, incrementing the control counter by 1, otherwise, recognizing the completion of the touch operation input, and setting the number of clicks included in the touch operation as the value of the counter.

Specifically, determining the validity of a $P_n$ click operation includes:

A1, when the new touch point $P_n$ is pressed (i.e., contacting with the designated region), recording the position coordinates on the X, Y axis and a timestamp of the touch point $P_n$ from an input event reported by the touch screen, and continuously monitoring the touch coordinates and the timestamp of the $P_n$ point from the input event reported by the touch screen;

A2, if the distance between the touch coordinates of the $P_n$ point at any time point and the touch coordinates at the time point where the $P_n$ point is pressed is greater than the pre-set threshold of moving distance, determining that the P point has been moved without triggering the click operation, otherwise, entering A3 step for continuously determining operation;

A3, if the time difference between the timestamp when the $P_n$ point is lifted and the timestamp when the $P_n$ point is pressed is greater than the pre-set threshold of the click time, no click operations in the $P_n$ point being triggered, otherwise, entering A4 step for continuously determining operation; and A4, if the touch point $P_n$ is lifted, then triggering a click operation in the Pn point, otherwise, entering A2 step for continuously determining operation.

Specifically, determining whether $P_n$ and constitute a valid combo operation (i.e., double-clicks operation) includes:

B1, assuming two consecutive touch points $P_n$ and $P_{n+1}$ in the report event sequence reported by the touch screen, and identifying the validity of a $P_n$ click in a press and lift process of the $P_n$ and if the $P_n$ click is not valid, determining that the double-clicks operation constituted by $P_n$, $P_{n+1}$ is not valid, otherwise, entering B2 for continuously determining operation;

B2, when $P_{n+1}$ is pressed, recording position coordinates of the contact on the X, Y axis and the timestamp of $P_{n+1}$, and if the time difference between the timestamp when $P_{n+1}$ is pressed and the timestamp when $P_n$ is lifted is greater than pre-set time threshold, determining that the double-clicks operation constituted by $P_n$, $P_{n+1}$ is not valid, otherwise, entering B3 for continuously determining operation;

B3, if the distance between the touch position when $P_{n+1}$ is pressed and the touch position when $P_n$ is lifted is greater than the pre-set distance threshold, determining the double-clicks operation constituted by $P_n$, $P_{n+1}$ is not valid, otherwise, entering B4 for continuously determining operation; and B4, identifying the validity of the $P_{n+1}$ click, and if the $P_n$ click is valid, determining that the double-clicks operation constituted by $P_n$, $P_{n+1}$ is valid, otherwise, determining that the double-clicks operation constituted by $P_n$, $P_{n+1}$ is not valid.

Further, in a preferred embodiment, step S320 includes:

identifying the left or right hand by which the current user holds the mobile terminal;

opening the numeric keypad that is suitable for the left hand when the current user holds the mobile terminal by the left hand; and opening the numeric keypad that is suitable for the right hand when the current user holds the mobile terminal by the right hand.

Specifically, as shown in FIG. 6, if the gray region on the left side is configured to be the numeric region and the black region on the right side is configured to be the symbol region. When using the right-hand to hold the mobile terminal in accordance with most users' holding habit, the user may use the thumb to operate in the black region on the right side, and use the middle finger to operate in the gray region on the left side. When the user changes to use the left hand to hold the mobile terminal, if the gray region on the left side is still set as the numeric region and the black region on the right side as the symbol region, the user need to use the thumb to operate in the gray region and use the middle finger to operate in the black region, which is difficult, even if the length of the left and right designated region is set to the length of the touch screen. When the user is accustomed to hold the mobile terminal in the right hand, the thumb is used to enter the symbol and the middle finger is used to input number. When the user holds the mobile terminal with his left hand, he may still use the thumb to enter the symbol and the middle finger to input number. In this situation, it is necessary to open the numeric keypad suitable for the left or right hand according to the left or right hand by which the user holds the mobile terminal.

Specifically, identifying the left or right hand by which the current user holds the mobile terminal can be realized by the following method:

A, determining whether the mobile terminal is in a state of being held;

B, if the mobile terminal is in the state of being held, determining whether the number of contacts on any one side are equal to or more than three, and if exists, when contacts on the left side are more than 3, determining that the right hand holds the mobile terminal, and when contacts on the right side are more than 3, determining that the left hand holds the mobile terminal, otherwise, proceeding to the step C;

C, identifying whether both the left and right sides have two contacts, if yes, comparing the distance between the two contacts on the left and right sides and coordinates of the contacts on the Y-axis, and if the distance between the two contacts on the left side is greater than the distance of the two contacts on the right side and the minimum coordinate value of the contacts on the Y-axis on the left side is less than the minimum coordinate of the contacts on the Y-axis on the right side, determining that the left hand holds the terminal, and vice versa, determining that the right hand holds the terminal, otherwise, proceeding to the step D; and D, obtaining horizontal tilt angle of the mobile terminal by a sensor, if it is a positive angle and reaches a certain threshold (such as greater than 5°), determining that the right hand holds the terminal, and if it is a negative angle and reaches a certain threshold (such as less than −5°), determining that the left hand holds the terminal.

In practical applications, the following method can be used to determine whether the mobile terminal is in a state of being held:

A, reporting the position coordinates of various contacts, when a new contact is pressed on the touch screen;

B, recording coordinates of the contacts and calculating the total number of contacts in the framework or upper application; and C, if the total number of contacts is greater than or equal to 3, identifying that the mobile terminal is in the state of being held.

Figure 7:
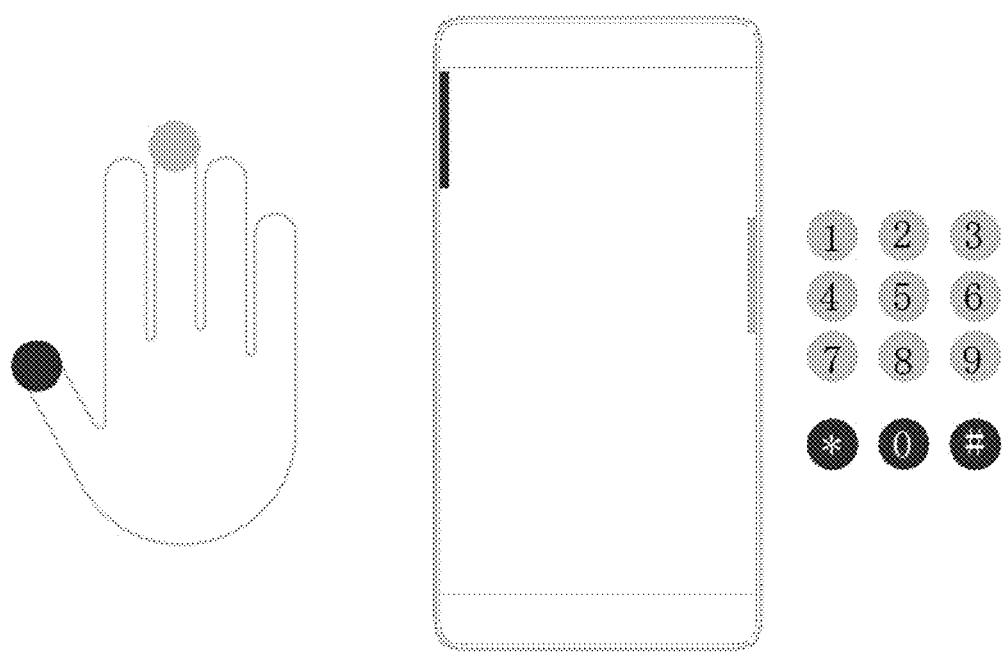
FIG. 7 is a schematic diagram of another dividing of numeric keypad region in the embodiment of FIG. 3.

In practical applications, the numeric keypad suitable for the left hand or the numeric keypad suitable for the right hand can be flexibly set. For example, the gray region on the left side as shown in FIG. 6 is the numeric region, and the black region on the right side is the symbol region, which is the numeric keypad suitable for the right hand. The gray region on the right side as shown in FIG. 7 can be set as the numeric region, the black region on the left side can be set as the symbol region, which is the numeric keypad suitable for the left hand.

Further, in a preferred embodiment, the method further comprises:

receiving a numeric keypad close instruction;
closing the numeric keypad of the designated region.

Specifically, when the system closes the numeric keypad or receives the relevant instruction, it is considered that the instruction to close the numeric keypad has been received.

Specifically, when the numeric keypad of the designated region is closed, the touch operation or generating effects according to the touch operation can be ignored, thus, the accident-touch operation due to accidently touch the designated region by the figure can be prevented.

It should be noted that, in practical applications, the dividing of the numeric keypad in the designated region and its relationship with the right and left hands, and the corresponding relationship between the number of clicks (i.e., the touch operations) and the input contents (the input contents including numbers and symbols) can be pre-set according to the actual situation.

The method for entering numeric symbols using a touch screen frame according to the present embodiment is as follows. When the frame touch function is enabled by the mobile terminal and the instruction to start the numeric keypad is received, the numeric keypad is opened in the designated region on the edge of the touch screen, and the touch operation entered by the user on the numeric keypad is received. The number or symbol corresponding to the touch operation is determined based on the operation region of the touch operation and the number of clicks included in the touch operation. Therefore, the user can make a call with the one-hand operation or enter the relative numbers or symbol keys while listening to the information in the answer to the phone. It is easy to operate and can improve the user's experience.

Figure 8:
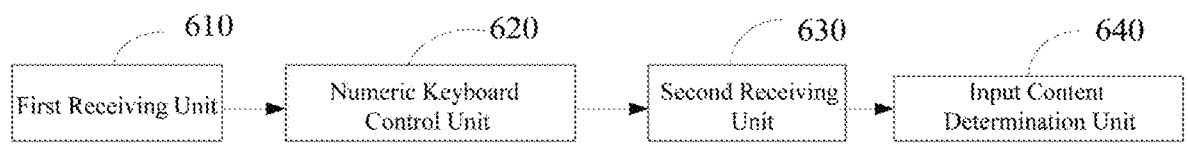
FIG. 8 is a block diagram of a module structure of an apparatus for entering numeric symbols using a touch screen frame according to embodiments of the present disclosure.

The present disclosure, on the basis of the above-described embodiments, further provides an apparatus for entering numeric symbols using a touch screen frame. Referring to FIG. 8, the apparatus comprises:

a first receiving unit 610, configured to receive an instruction to start a numeric keypad;

a numeric keypad control unit 620, configured to open the numeric keypad in a designated region on edge of the touch screen;

a second receiving unit 630, configured to receive a touch operation inputted by the user on the numeric keypad; and an input content determination unit 640, configured to determine a number or a symbol corresponding to the touch operation based on an operation region of the touch operation and a number of clicks included in the touch operation.

Further, in a preferred embodiment, the input content determination unit 640 is further configured to calculate the number of clicks included in the touch operation when the operation region is the numeric region, and to determine the input number of the touch operation based on the number of clicks, or to calculate the number of clicks included in the touch operation when the operation region is the symbol region, and to determine a symbol or number 0 entered by the touch operation based on the number of clicks and the pre-set corresponding relationship between the number of clicks and symbols.

Further, in a preferred embodiment, the input content determination unit 640 includes:

a click determination module, configured to determine the validity of a $P_n$ click operation when the click operation is started, and to increment a control counter by 1 when the click operation is valid, where the initial value of the counter is 0; and a double-clicks determination module, configured to determine whether $P_n$ and $P_{n+1}$ constitute a valid double-clicks operation when the $P_n$ click operation is valid. If yes, the control counter is incremented by 1, otherwise, the completion of the touch operation input is determined, and the value of the counter is the number of clicks included in the touch operation.

Specifically, the click determination module determines the validity of the $P_n$ click operation by the following steps:

A1, when the new touch point $P_n$ is pressed (i.e., contacting with the designated region), recording the position coordinates on the X, Y axis and a timestamp of the touch point $P_n$ from an input event reported by the touch screen, and continuously monitoring the touch coordinates and the timestamp of the $P_n$ point from the input event reported by the touch screen;

A2, if the distance between the touch coordinates of the $P_n$ point at any time point and the touch coordinates at the time point where the $P_n$ point is pressed is greater than the pre-set threshold of moving distance, determining that the P point has been moved without triggering the click operation, otherwise, entering A3 step for continuously determining operation;

A3, if the time difference between the timestamp when the $P_n$ point is lifted and the timestamp when the $P_n$ point is pressed is greater than the pre-set threshold of the click time, no click operations in the $P_n$ point being triggered, otherwise, entering A4 step for continuously determining operation; and A4, if the touch point $P_n$ is lifted, then triggering a click operation in the Pn point, otherwise, entering A2 step for continuously determining operation.

Specifically, determining whether $P_n$ and $P_{n+1}$ constitute a valid combo operation (i.e., double-clicks operation) includes:

B1, assuming two consecutive touch points $P_n$ and $P_{n+1}$ in the report event sequence reported by the touch screen, and identifying the validity of a $P_n$ click in a press and lift process of the $P_n$, and if the $P_n$ click is not valid, determining that the double-clicks operation constituted by $P_n$, $P_{n+1}$ is not valid, otherwise, entering B2 for continuously determining operation;

B2, when $P_{n+1}$ is pressed, recording position coordinates of the contact on the X, Y axis and the timestamp of $P_{n+1}$, and if the time difference between the timestamp when $P_{n+1}$ is pressed and the timestamp when $P_n$ is lifted is greater than pre-set time threshold, determining that the double-clicks operation constituted by $P_n$, $P_{n+1}$ is not valid, otherwise, entering B3 for continuously determining operation;

B3, if the distance between the touch position when $P_{n+1}$ is pressed and the touch position when $P_n$ is lifted is greater than the pre-set distance threshold, determining the double-clicks operation constituted by $P_n$, $P_{n+1}$ is not valid, otherwise, entering B4 for continuously determining operation; and B4, identifying the validity of the $P_{n+1}$ click, and if the $P_n$ click is valid, determining that the double-clicks operation constituted by $P_n$, $P_{n+1}$ is valid, otherwise, determining that the double-clicks operation constituted by $P_n$, $P_{n+1}$ is not valid.

Further, in a preferred embodiment, the numeric keypad opening unit 620 includes:

a determining module, configured to identify the left or right hand by which the current user holds the mobile terminal; and an opening module, configured to open the numeric keypad that is suitable for the left hand when the current user holds the mobile terminal by the left hand or to open the numeric keypad that is suitable for the right hand when the current user holds the mobile terminal by the right hand.

Specifically, the determining module identifies the left or right hand by which the current user holds the mobile terminal by the following steps:

A, determining whether the mobile terminal is in a state of being held;

B, if the mobile terminal is in the state of being held, determining whether the number of contacts on any one side are equal to or more than three, and if exists, when contacts on the left side are more than 3, determining that the right hand holds the mobile terminal, and when contacts on the right side are more than 3, determining that the left hand holds the mobile terminal, otherwise, proceeding to the step C;

C, identifying whether both the left and right sides have two contacts, if yes, comparing the distance between the two contacts on the left and right sides and coordinates of the contacts on the Y-axis, and if the distance between the two contacts on the left side is greater than the distance of the two contacts on the right side and the minimum coordinate value of the contacts on the Y-axis on the left side is less than the minimum coordinate of the contacts on the Y-axis on the right side, determining that the left hand holds the terminal, and vice versa, determining that the right hand holds the terminal, otherwise, proceeding to the step D; and D, obtaining horizontal tilt angle of the mobile terminal by a sensor, if it is a positive angle and reaches a certain threshold (such as greater than 5°), determining that the right hand holds the terminal, and if it is a negative angle and reaches a certain threshold (such as less than −5°), determining that the left hand holds the terminal.

Further, in a preferred embodiment, the first receiving unit 610 is also configured to receive a numeric keypad close instruction; and the numeric keypad control unit 620 is further configured to close the numeric keypad of the designated region after receiving the numeric keypad close instruction.

Further, in a preferred embodiment, the apparatus may further include a setting unit configured to pre-set the dividing of the numeric keypad in the designated region and its relationship with the right and left hands, and the corresponding relationship between the number of clicks (i.e., the touch operations) and the input contents (the input contents including numbers and symbols).

In practical applications, the dividing of the region and the corresponding relationship between the number of clicks and the input contents can be flexibly set according to actual situation.

The apparatus for entering numeric symbols using a touch screen frame according to the present embodiment can open the numeric keypad in the designated region on the edge of the touch screen, when the frame touch function is enabled by the mobile terminal and the instruction to start the numeric keypad is received. When the second receiving unit receives the touch operation entered by the user on the numeric keypad, the input content determination unit determine the number or symbol corresponding to the touch operation based on the operation region of the touch operation and the number of clicks included in the touch operation. Therefore, the user can make a call with the one-hand operation or enter the relative numbers or symbol keys while listening to the information in the answer to the phone. It is easy to operate and can improve the user's experience.

The apparatus for entering numeric symbols using a touch screen frame according to the present embodiment includes various units, for example, the first receiving unit, the numeric keypad control unit, the second receiving unit, and the input content determining unit, as well as each module included in each unit, for example, the input content determining includes the click determination module and the double-clicks determination module, both of which may be implemented by a processor in the mobile terminal, and may, of course, be implemented by a logic circuit. In the specific embodiment, the processor may be a central processing unit (CPU), a microprocessor (MPU), a digital signal processor (DSP), or a field-programmable gate array (FPGA).

It should be noted that if the above-described method for entering numeric symbols using a touch screen frame according to embodiments of the present disclosure may be implemented in the form of a software function module and is sold or used as a separate product, it can also be stored in a computer-readable storage medium. Based on this understanding, the technical solution of the present disclosure, in essence, or in the form of a prior art, can be embodied in the form of a software product, the software product stored in a storage medium (such as ROM/RAM, disk, CD-ROM), and the software product includes a number of instructions for enabling a computer device (which may be a mobile phone, a computer, a server, or a network device, etc.) to perform all or part of the method described in the various embodiments of the present disclosure. The aforementioned storage medium includes various mediums that can store instructions, such as a USB disk, a mobile hard disk, a read-only memory (ROM), a magnetic disk or an optical disk, and the like. Thus, embodiments of the present disclosure are not limited to any particular combination of hardware and software.

Accordingly, an embodiment of the present disclosure further provides a computer storage medium in which computer-executable instructions for executing a method for entering numeric symbols using a touch screen frame according to embodiments of the present disclosure.

In accordance with the foregoing embodiments, an embodiment of the present disclosure provides a mobile terminal comprising a touch screen and a processor, which can execute the following steps: receiving an instruction to open a numeric keypad; opening the numeric keypad in a designated region on edge of the touch screen; receiving a touch operation input by a user on the numeric keypad; determining a number or symbol corresponding to the touch operation based on the operation region of the touch operation and the number of clicks included in the touch operation.

According to the foregoing embodiments, an embodiment of the present disclosure provides a mobile terminal, the mobile terminal comprising a storage medium configured to store computer-executable instructions; and a processor configured to execute computer-executable instructions stored on the storage medium, the computer-executable instructions comprising: receiving instructions to open a numeric keypad; opening the numeric keypad in a designated region on edge of the touch screen; receiving a touch operation input by a user on the numeric keypad; determining a number or symbol corresponding to the touch operation based on the operation region of the touch operation and the number of clicks included in the touch operation.

It should be noted that, in this context, the use of terms such as "comprising", "including", or any other variant thereof is intended to encompass a non-exclusive inclusion, such that a process, method, article or apparatus comprising a series of elements includes not only those elements, but also other elements that are not explicitly listed, or are elements that are inherent to such processes, methods, articles, or apparatus. In the absence of more restrictions, the elements defined by the statement "including a . . . " do not exclude the presence of additional elements in the process, method, article, or apparatus that includes the element.

The above-described embodiments of the present disclosure are for the sake of description only and are not the representative of embodiments.

With the description of the above embodiments, It will be apparent, to one skilled in the art that specific details are not required to practice the disclosure. The foregoing description of specific embodiments of the present disclosure has been presented for the purpose of illustration. They are not intended to be exhaustive or to limit the invention to the precise form disclosed. In view of the above doctrines, many modifications and variations are possible. These embodiments are shown and described in order to best explain the principles of the present disclosure and its practical application so that other technicians skilled in the art will be able to make good use of the present disclosure and various modifications that are suitable for the intended use various embodiments. It is intended that the scope of the disclosure be defined by the following claims and their equivalents.

The foregoing is merely preferred embodiments of the present disclosure and is not intended to limit the scope of the disclosure. Both of which is to be carried out by equivalent structure or equivalent process transformation using the present specification and the accompanying drawings, and is to be directly or indirectly applied in other related technical fields, are included within the scope of the protection of the present disclosure.

INDUSTRIAL UTILITY

The embodiment of the present disclosure includes: receiving an instruction to open a numeric keypad; opening the numeric keypad in a designated region on edge of the touch screen; receiving a touch operation input by a user on the numeric keypad; determining a number or symbol corresponding to the touch operation based on the operation region of the touch operation and the number of clicks included in the touch operation. Therefore, the user can make a call with the one-hand operation or enter the relative numbers or symbol keys while listening to the information in the answer to the phone. It is easy to operate and can improve the user's experience.

What is claimed is:

1. A method for entering numeric symbols using a touch screen frame, comprising:
    receiving an instruction to start a numeric keypad;
    opening the numeric keypad in a specific region on an edge of the touch screen;
    receiving a touch operation entered by a user on the numeric keypad; and
    determining a number or a symbol corresponding to the touch operation according to an operation region of the touch operation and a number of clicks included in the touch operation, wherein determining the number or the symbol includes:
        when the operation region is a numeric region, calculating the number of clicks included in the touch operation, and determining the number entered by the touch operation based on the number of clicks of the touch operation; and when the operation region is a symbol region, calculating the number of clicks included in the touch operation, and determining the symbol or number 0 entered by the touch operation based on the number of clicks and a pre-set corresponding relationship between the number of clicks and symbols.

2. The method according to claim 1, wherein calculating the number of clicks included in the touch operation comprises:

A. when the touch operation input is started, determining validity of a Pn click operation, and when the click operation is valid, incrementing a control counter by 1 and performing step B, where an initial value of the counter is 0; and B. if Pn and Pn+1 constitute a valid double-click operation, incrementing the control counter by 1, otherwise, recognizing a completion of the touch operation input, and setting the number of clicks included in the touch operation as a value of the counter.

3. The method according to claim 1, wherein opening the numeric keypad in the specific region on the edge of the touch screen, comprises:

identifying a left hand or a right hand by which a current user holds a mobile terminal;

opening the numeric keypad that is suitable for the left hand when the current user holds the mobile terminal by the left hand; and opening the numeric keypad that is suitable for the right hand when the current user holds the mobile terminal by the right hand.

4. The method according to claim 3, further comprising:
receiving a numeric keypad close instruction; and
closing the numeric keypad of a designated region.

5. A mobile terminal device, comprising:
a touch screen; and
an apparatus for entering numeric symbols using a touch screen frame and being executed by a mobile terminal to:
receive an instruction to start a numeric keypad;
open the numeric keypad in a designated region on an edge of the touch screen by identifying a left or right hand by which a current user holds the mobile terminal; and opening the numeric keypad that is suitable for the left hand when the current user holds the mobile terminal by the left hand or opening the numeric keypad that is suitable for the right hand when the current user holds the mobile terminal by the right hand;
receive a touch operation inputted by the user on the numeric keypad; and
determine a number or a symbol corresponding to the touch operation based on an operation region of the touch operation and a number of clicks included in the touch operation,
when the operation region is a numeric region, calculate the number of clicks included in the touch operation, and determine the number entered by the touch operation based on the number of clicks of the touch operation; and
when the operation region is a symbol region, calculate the number of clicks included in the touch operation, and determine the symbol or number 0 entered by the touch operation based on the number of clicks and a pre-set corresponding relationship between the number of clicks and symbols.

6. The device according to the claim 5, wherein the mobile device is further configured to calculate the number of clicks included in the touch operation when the operation region is a numeric region, and to determine the input number of the touch operation based on the number of clicks, or to calculate the number of clicks included in the touch operation when the operation region is a symbol region, and to determine the symbol or number 0 entered by the touch operation based on the number of clicks and a pre-set corresponding relationship between the number of clicks and symbols.

7. The device according to claim 6, wherein the mobile device is further configured to:

determine validity of a Pn click operation when the click operation is started, and to increment a control counter by 1 when the click operation is valid, where an initial value of the counter is 0; and determine whether Pn and Pn+1 constitute a valid double-click operation when the Pn click operation is valid; If the valid double-click operation is constituted, the control counter is incremented by 1, otherwise, a completion of the touch operation input is determined, and the value of the counter is the number of clicks included in the touch operation.

8. The device according to claim 5, wherein the mobile device is further configured to:
receive a numeric keypad close instruction; and
close the numeric keypad in the designated region on the edge of the touch screen.

9. A non-transitory computer storage medium, the computer storage medium storing computer-executable instructions, and the computer-executable instructions comprising:
receiving an instruction to start a numeric keypad;
opening the numeric keypad in a specific region on an edge of a touch screen;
receiving a touch operation entered by a user on the numeric keypad; and
determining a number or a symbol corresponding to the touch operation according to an operation region of the touch operation and a number of clicks included in the touch operation, wherein determining the number or the symbol includes:
when the operation region is a numeric region, calculating the number of clicks included in the touch operation, and determining the number entered by the touch operation based on the number of clicks of the touch operation; and
when the operation region is a symbol region, calculating the number of clicks included in the touch operation, and determining the symbol or number 0 entered by the touch operation based on the number of clicks and a pre-set corresponding relationship between the number of clicks and symbols.

10. The storage medium according to claim 9, wherein calculating the number of clicks included in the touch operation comprises:

A. when the touch operation input is started, determining validity of a Pn click operation, and when the click operation is valid, incrementing a control counter by 1 and performing step B, where an initial value of the counter is 0; and B. if Pn and Pn+1 constitute a valid double-click operation, incrementing the control counter by 1, otherwise, recognizing a completion of the touch operation input, and setting the number of clicks included in the touch operation as a value of the counter.

11. The storage medium according to claim 9, wherein opening the numeric keypad in the specific region on the edge of the touch screen, comprises:
    identifying a left hand or a right hand by which a current user holds a mobile terminal;
    opening the numeric keypad that is suitable for the left hand when the current user holds the mobile terminal by the left hand; and
    opening the numeric keypad that is suitable for the right hand when the current user holds the mobile terminal by the right hand.

12. The storage medium according to claim 11, further comprising:
    receiving a numeric keypad close instruction; and
    closing the numeric keypad of a designated region.

13. A mobile terminal, comprising:
    a touch screen and a processor, wherein the processor is configured to execute following steps:
    receiving an instruction to open a numeric keypad;
    opening the numeric keypad in a designated region on an edge of the touch screen, by:
        identifying a left hand or a right hand by which a current user holds the mobile terminal, opening the numeric keypad that is suitable for the left hand when the current user holds the mobile terminal by the left hand, and opening the numeric keypad that is suitable for the right hand when the current user holds the mobile terminal by the right hand;
    receiving a touch operation input by a user on the numeric keypad; and
    determining a number or symbol corresponding to the touch operation based on an operation region of the touch operation and a number of clicks included in the touch operation, wherein determining the number or symbol corresponding to the touch operation includes:
        when the operation region is a numeric region, calculating the number of clicks included in the touch operation, and determining the number entered by the touch operation based on the number of clicks of the touch operation; and
        when the operation region is a symbol region, calculating the number of clicks included in the touch operation, and determining the symbol or number 0 entered by the touch operation based on the number of clicks and a pre-set corresponding relationship between the number of clicks and symbols.

14. The mobile terminal according to claim 13, wherein calculating the number of clicks included in the touch operation comprises:
    A. when the touch operation input is started, determining validity of a Pn click operation, and when the click operation is valid, incrementing a control counter by 1 and performing step B, where an initial value of the counter is 0; and
    B. if Pn and Pn+1 constitute a valid double-click operation, incrementing the control counter by 1, otherwise, recognizing a completion of the touch operation input, and setting the number of clicks included in the touch operation as a value of the counter.

15. A mobile terminal, comprising:
    a storage medium, configured to store computer-executable instructions; and
    a processor, configured to execute the computer-executable instructions stored on the storage medium, the computer-executable instructions comprising:
        receiving instructions to open a numeric keypad; opening the numeric keypad in a designated region on an edge of the touch screen;
        receiving a touch operation input by a user on the numeric keypad;
        determining a number or symbol corresponding to the touch operation based on an operation region of the touch operation and a number of clicks included in the touch operation, wherein determining the number or the symbol includes:
            when the operation region is a numeric region, calculating the number of clicks included in the touch operation, and determining the number entered by the touch operation based on the number of clicks of the touch operation; and
            when the operation region is a symbol region, calculating the number of clicks included in the touch operation and determining the symbol or number 0 entered by the touch operation based on the number of clicks and a pre-set corresponding relationship between the number of clicks and symbols.

16. The mobile terminal according to claim 15, wherein calculating the number of clicks included in the touch operation comprises:
    A. when the touch operation input is started, determining validity of a Pn click operation, and when the click operation is valid, incrementing a control counter by 1 and performing step B, where an initial value of the counter is 0; and
    B. if Pn and Pn+1 constitute a valid double-click operation, incrementing the control counter by 1, otherwise, recognizing a completion of the touch operation input, and setting the number of clicks included in the touch operation as a value of the counter.

17. The mobile terminal according to claim 15, wherein opening the numeric keypad in the specific region on the edge of the touch screen comprises:
    identifying a left hand or a right hand by which a current user holds a mobile terminal;
    opening the numeric keypad that is suitable for the left hand when the current user holds the mobile terminal by the left hand; and
    opening the numeric keypad that is suitable for the right hand when the current user holds the mobile terminal by the right hand.

18. The mobile terminal according to claim 17, the computer-executable instructions further comprising:
    receiving a numeric keypad close instruction; and
    closing the numeric keypad of a designated region.

* * * * *